April 25, 1967 W. W. MARTIN 3,315,948

AIR CONDITIONING SYSTEM

Filed April 29, 1965

4 Sheets-Sheet 1

INVENTOR.

WARNER W. MARTIN

BY

Marechal, Biebel, French & Bugg

ATTORNEYS

INVENTOR.
WARNER W. MARTIN
BY
Marechal, Biebel, French & Bugg
ATTORNEYS

INVENTOR.
WARNER W. MARTIN
BY
Marechal, Biebel, French & Bugg
ATTORNEYS

AIR CONDITIONING SYSTEM

Filed April 29, 1965

INVENTOR.
WARNER W. MARTIN
BY
Marechal, Biebel, French & Bugg
ATTORNEYS

United States Patent Office 3,315,948

Patented Apr. 25, 1967

3,315,948

AIR CONDITIONING SYSTEM

Warner W. Martin, Olmstead Falls, Ohio, assignor to The Lau Blower Company, Dayton, Ohio, a corporation of Ohio Filed Apr. 29, 1965, Ser. No. 451,738
9 Claims. (Cl. 261—26)

This invention relates to the art of air conditioning, and particularly to apparatus and process for increasing the moisture content of air with improved efficiency.

More particularly, this invention relates to humidifiers or evaporation coolers of the power operated type wherein the evaporation media is moved through a water reservoir and air forced over the surfaces thereof, or wherein water is pumped from a reservoir and allowed to trickle down through the media as air flows thereover. In the latter type, the water which is not evaporated returns to the reservoir and is recirculated again by a pump, and this is appropriately termed the recirculating type.

The evaporation media in these humidifiers or coolers is usually constructed of woven fabrics, glass fibers or wool, woven wire, expanded metals, open cell foams, asbestos, or excelsior. All suffer from the disadvantage that the usual dissolved minerals or salts in tap water build up on these materials as water is evaporated therefrom, causing them eventually to become clogged with consequent reduction in evaporation. In addition, the concentration of these deposits within the reservoir increases by reason of the washing action performed on the media material by the water so that deposits also precipitate out of the water and collect on the surfaces of the reservoir. Heretofore, unless the water is distilled, these deposits were always present thus requiring frequent cleaning in order to sustain efficient operation of the humidifier or cooler unit.

One answer to the problem in the stationary media type of unit is the elimination of a reservoir so that the excess water is drained to a drain after trickling down through the media rather than being recirculated. The water flow cannot be reduced to the point that all of the water is evaporated, since all of the salts would be deposited on the media and it becomes quickly clogged. On the other hand, if a substantial excess of water flow is provided so that no part of the media becomes dry and there is no lime deposited, there is a loss of a substantial quantity of water. In many cases this rate of loss is as much as one hundred gallons per day which is both expensive and burdensome on water supply systems. Thus this invention substantially reduces the deposition of the solids by limiting the level of saturation of the salts within the reservoir and on the evaporation material.

Accordingly, an important object of this invention is to provide a process and apparatus for increasing the moisture content of air while substantially eliminating the mineral deposits on the evaporation material or in the reservoir without the loss of more than a very minimum amount of water.

Another object of this invention is to provide a process and apparatus for limiting the level of saturated mineral deposits within the water present in the reservoir and on the evaporation media of a humidifier without substantial loss of water so that precipitation of the deposits does not occur, thereby substantially reducing or eliminating these deposits from the reservoir and evaporator material to increase substantially the periods between cleaning of the media.

A further object of this invention is to provide a humidifier system with a purge unit for periodically removing a preset volume of water from the humidifier reservoir, and particularly to provide a purge unit for the aforesaid system which can be adapted for use with substantially any humidifier or evaporation of the moving media or recirculating type.

Another object of this invention is to provide a humidifier system wherein the opening and closing of the water control valve to maintain a preset level of water within a reservoir of a humidifier causes a preset amount of highly concentrated water within the reservoir to be purged therefrom, thereby reducing the level of saturation with the reservoir and on the evaporation media to improve the evaporation characteristics of the humidifier.

Another object of this invention is to provide a pump which is simple and inexpensive in design while having a capacity which is easily varied by the average home owner, and further to provide such a pump which has positive displacement, is self-priming, and has improved non-clogging and positive sealing check valves in the inlet and outlet.

Additional objects and advantages of the invention will be apparent from the following description, the accompanying drawings and the appended claims.

The invention herein involves the process for continually maintaining the concentration of dissolved minerals within the reservoir of a humidifier or evaporating cooler below a preset level so that these minerals do not precipitate from the solution and thus form deposits in the reservoir. The media is maintained continually wet and is periodically washed with water from the reservoir so that the deposit of the minerals thereon is greatly reduced. The invention further includes a small self-contained purge unit adapted for connection substantially to any power operated humidifier or evaporative cooler for accomplishing the process set out above in a simplified and inexpensive manner.

Figures 1, 2, 3:
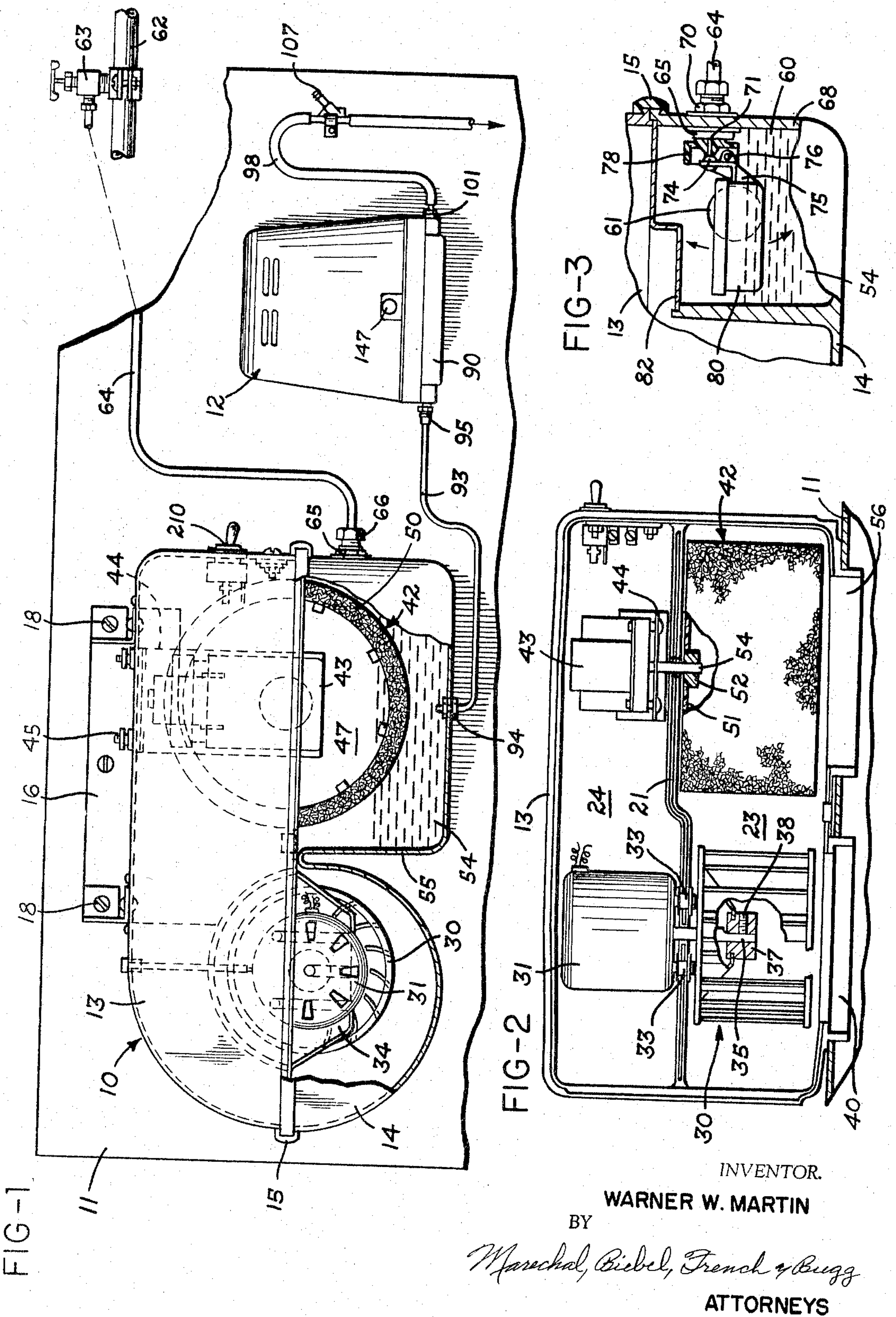
FIG. 1 is a side elevation view of an air moisturizing system with portions thereof partially broken away to illustrate the construction thereof.
FIG. 2 is a view from below the humidifier with the lower housing removed.
FIG. 3 is a sectional view taken generally along the lines 3—3 of FIG. 4.
Figure 4:
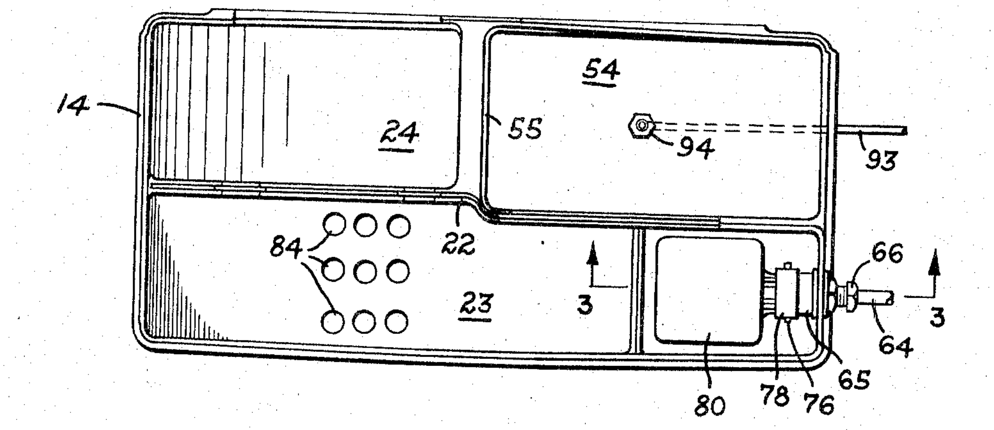
FIG. 4 is a plan view of the lower housing of the humidifier.

Referring to the drawings wherein preferred embodiments of the invention are shown, FIG. 1 shows a power operated humidifier 10 mounted on the side wall 11 of a hot air furnace so that hot air can be drawn from the furnace and moisture added thereto before it is recirculated into the furnace. The purge unit 12 is mounted on the wall 11 at one side of the humidifier 10 for maintaining the dissolved mineral concentration in the reservoir below a preset level. As will be seen, this humidifier 10 per se and apart from the combination forms no part of the invention, and the purge unit 12 may be used with substantially all humidifiers or evaporator coolers wherein the media is moved through a reservoir or the water is recirculated through the media. Thus throughout the description of the process and the combination, the humidifier will be considered equivalent to an evaporative cooler.

*The humidifier*

The power operated humidifier 10 is shown in FIGS. 1–4 and has upper and lower housings 13 and 14 which are clamped together by the retainer 15. The entire assembly 10, as shown in FIG. 1, is secured to the outside vertical wall 11 of a hot air furnace plenum or similar device, and thus can be attached to substantially any air conditioning device since it does not require space in the interior of such device. The supporting means for the humidifier 10 comprises the flange 16 which is rigidly secured to the upper housing 13 of the humidifier which, in turn, is secured to the wall 11 by screws 18.

As illustrated in FIG. 2, a vertical partition 21 in the upper housing 13 divides the same into an air flow chamber 23 and a motor chamber 24. The partition 21 mates with a similar partition 22 in the lower housing 14 to further define the separate chambers 23 and 24 in the assambled housing. Mounted on the partition 21 is a blower assembly which includes a single inlet blower wheel 30 and driving motor 31. The bolts 33 are utilized, as shown in FIG. 2, to mount the motor 31 securely on the downwardly extending tongue 34 (FIG. 1) of the partition 21, and the blower wheel 30 is mounted on the motor shaft 35 by means of the hub 37 and set screw 38. A passageway 40 suitably projects into the furnace through the wall 11 to permit the blower 30 to draw air from the furnace.

Also mounted in the upper housing 13, in spaced parallel relationship with blower assembly 30, is the evaporator drum assembly 42 which is of particular importance to the invention in that it is utilized to transfer moisture to the air. Included in this assembly is the motor 43 supported by the bracket 44 which is secured by the nuts 45 to the top of the upper housing 13 for easy removal, as shown in FIG. 1, and a cylindrical frame or support wheel 47 with a sleeve 50 therearound. The frame 47 has a solid back plate 51 with a hub 52 thereon for securing the frame to the shaft 53 of motor 43, so that the sleeve 50 is rotated by the motor 43.

The sleeve or media 50 is snugly fitted around the circumferential surface of drum 42 for easy removal therefrom, and its lower portion extends into a reservoir 54 formed in the air flow chamber 23 and the lower housing 14, as shown in FIG. 1, by the wall 55. This reservoir 54 is normally maintained with a desired level of water therein, and the portion of the sleeve 50 which is submerged in this water becomes wetted thereby. The flow of air from the blower 30 passing over and through the sleeve 50 then evaporates the water in the wetted areas. The interior of the drum 42 is accordingly connected by means of an outlet passageway 56 with the interior of the furnace, the passageway 56 extending through the furnace wall 11 similarly to the inlet passageway 40 as shown in FIG. 2.

The sleeve 50 preferably is formed of a highly porous non-absorbent media such as resilient polyurethane open cell foam having a porosity of 8 to 13 pores per lineal inch, with best results being obtained using 10 pores per lineal inch since the sleeve has numerous irregularly spaced pores or passages therethrough, and this characteristic provides the sleeve 50 with a relatively large effective surface area to become wetted when the sleeve is submerged in water. Another advantage of this material is that the total space consumed by the sleeve 50 is much less than that of other materials capable of providing the amount of surface area. The particular porosity is dependent upon the thickness, diameter, and width of the sleeve, as well as the rate of air flow therethrough.

Figures 5, 6, 7, 8, 9:
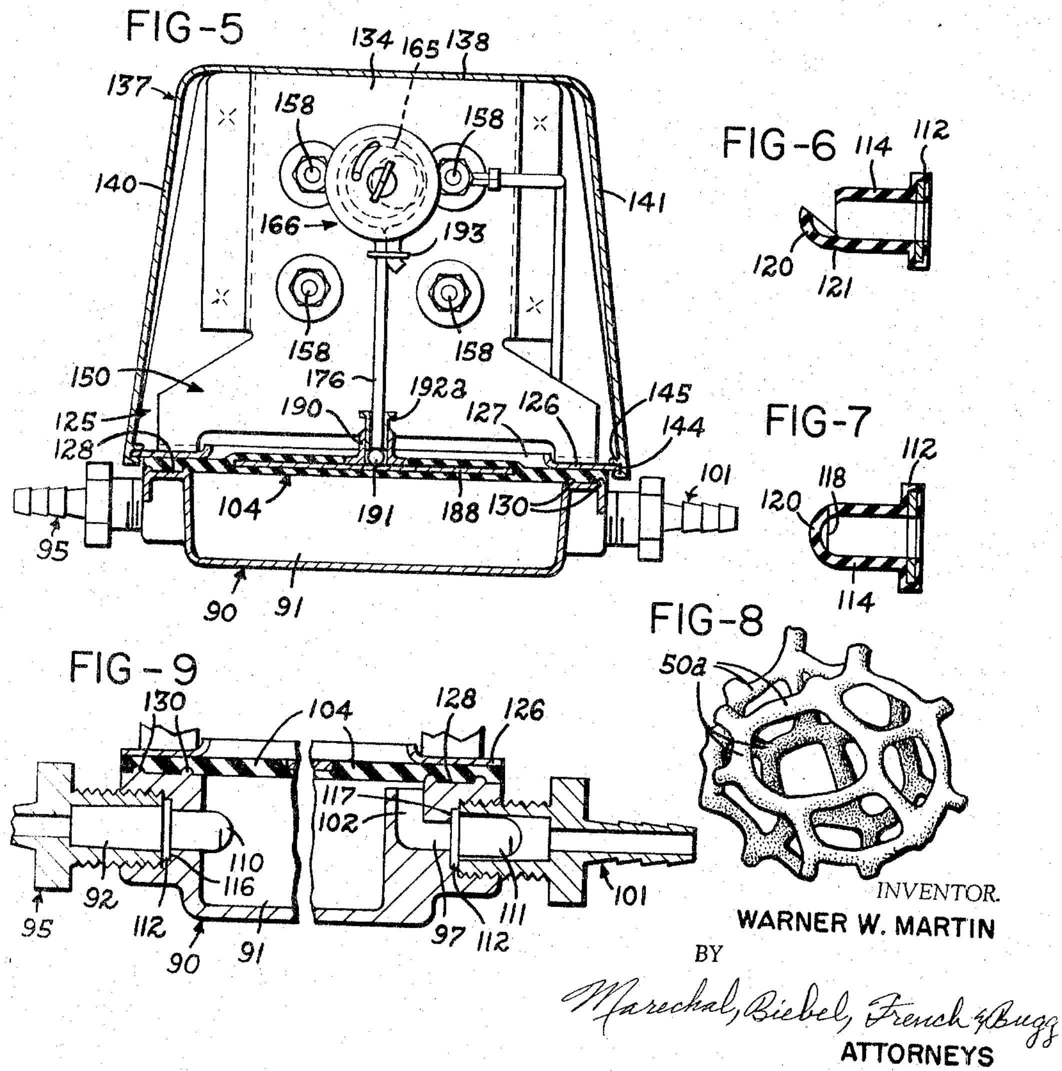
FIG. 5 is a sectional view of the purge unit taken along the line 5—5 of FIG. 10.
FIGS. 6 and 7 are sectional views through the one way valves used in the purge unit.
FIG. 8 is a substantially enlarged fragmentary view of a portion of the media.
FIG. 9 is a fragmentary sectional view of the purge unit taken along the line 9—9 of FIG. 11.

As shown in the greatly enlarged view of FIG. 8, this polyurethane foam is composed of uniformly distributed interconnecting strands 50*a* which form a three-dimensional structure of openings or pores, without a covering membrane or surface of the type often found in foam rubber materials. The random arrangement of the pores eliminates straight channels through this material so that air flowing therethrough passes around each strand 50*a*, thus creating maximum contact therewith with a minimum of air resistance. Also the flow through the material is uniform through so that there is maximum flow therethrough. While the pores are not precisely the same size, they are predominately within a range of similar sizes so that the air flowing through and moisture added thereto is uniform throughout the surface on which water is deposited and evaporated therefrom for maximum efficiency of the unit.

To remove the media sleeve 50 from the housing, it is merely necessary to remove the lower housing 14, and release the motor 43 and evaporator drum assembly 42 from the upper housing 13 by removing the nuts 45 which secure the bracket 44 to the housing 13. Once removed from the housing, the removal of the media sleeve 50 from the support wheel 47 is relatively simple in view of the resilience also facilitates removal of the salt deposits in the innermost pores since the sleeve 50 can be twisted, stretched, etc.

The reservoir water level control system is illustrated in FIGS. 1 and 3 and includes a float chamber 60 which is formed in the lower housing 14 below the motor 43. The aperture 61 in the partition 22 of the lower housing 13 permits water to flow from this float chamber 60 to the water reservoir 54. Ordinary tap water is connected to the water level control system from the supply pipe 62 and manual valve 63 through conduit 64 which is secured to the valve body 65 by the female connection 66. The valve body 65 is in turn securely fastened to the wall 68 of the lower housing 14 by the nut 70. A longitudinal passage 71 through the valve body terminates at one end in an orifice which has the flow of water therethrough controlled by the valve disk 74.

The valve disk 74 is composed of rubber, neoprene or other soft durable material and is mounted on and rotates with an arm 75 between a closed position wherein it closes the passage 71 and prohibits water flow therefrom, and an open position wherein it is spaced from the passage 71 and permits water to flow therefrom in the float chamber 60. The arm 75 is rotatably secured by pivot pin 76 to the shroud 78 on the valve body 65 and extends around three sides thereof.

A float 80 is rigidly secured to the arm 75 and acts as the water level control sensing and actuating means which moves the valve arm 75 and valve disk 74 to maintain the predetermined water level in the chamber 60 above the lowermost edge of the opening 61. That is, when the water level in float chamber 60 changes, the buoyancy of the float 80 causes it to rise or fall and thereby rotate the arm 75 which, in turn, moves the valve disk 74 with respect to the passage 71. Water in the float chamber thus flows through the opening 61 to maintain an equal water level therein.

The cover 82 is provided over the top of the float chamber 60 so that water cannot be sprayed from the water level control system onto either of the motors 31 or 43. The openings 84 (FIG. 4) may be appropriately provided in housing 14 to allow natural convection currents of air to flow over either or both of the motors 31 and 43 thus providing for cooling thereof.

*Purge unit*

The self-contained purge unit 12 which is shown in FIGS. 1 and 5–14 forms an important part of this invention, and as will become apparent, this unit can be adapted for use with substantially any power operated humidifier or evaporative cooler. The unit has a rigid dish-shaped base 90 (FIGS. 5 and 9) which, in part, defines the expandable chamber 91 having an inlet passage 92 connected to the reservoir 54 of the humidifier 10 through the conventional tubing 93 having suitable water-tight couplings 94 and 95 at each end thereof. The connection to the reservoir 54 is in the bottom thereof below the predetermined level of water therein so that the pumping action of the purge unit 12 will always remove water from this reservoir.

The base 90 has an outlet passage 97 which is in communication with a drain through the drain tube 98 threadedly connected thereto by the conventional coupling 101. The outlet passage 97 is L-shaped to locate the entrance 102 thereto near the reciprocating diaphragm 104 so that air will quickly be eliminated from the chamber 91 when the unit 12 commences operation, as will be explained in detail. The drain tube 98 immediately downstream of the purge unit 12 rises to a point above the predetermined level of water in the reservoir 54 and has a syphon break 106 (FIG. 1) therein as required by many Governmental regulations. Since the syphon break 106 has a connection 107 to the atmosphere above the aforesaid predetermined water level, a syphoning action from the reservoir 54 through the tube 93 and the chamber 91 cannot occur when operation of the unit 12 is terminated.

The inlet and outlet passages 92 and 97 have one-way valves 110 and 111, respectively, therein (FIGS. 6, 7 and 9) and these valves each have a reinforced annular flange 112 which extends around the tubular body portion 114 and is clamped in place against the shoulders 116 and 117 in the base 90 by the couplings 95 and 101, respectively. The valves 110 and 111 are formed of an elastomeric material, such as rubber, and the tubular body portion 114 is initially formed closed at one end. A slit 118 (FIG. 7) is cut substantially through this closed end perpendicularly to the axis of the tubular portion 114 to form a valve member 120 which is hinged at 121 to the body portion 114. Thus flow axially through the interior of body portion 114 toward the valve member 120 tends to open the valve member whereas flow in the opposite direction tends to close the valve member 120. The valve 110 in the inlet passage is therefore disposed with the member 120 at the inner end of the valve to prohibit flow from the chamber 91, and the valve 111 in the outlet passage 97 has the valve member 120 at the outermost end thereof so that water wil not flow into the chamber 91.

Figures 10, 11, 12, 13, 14, 15, 16:
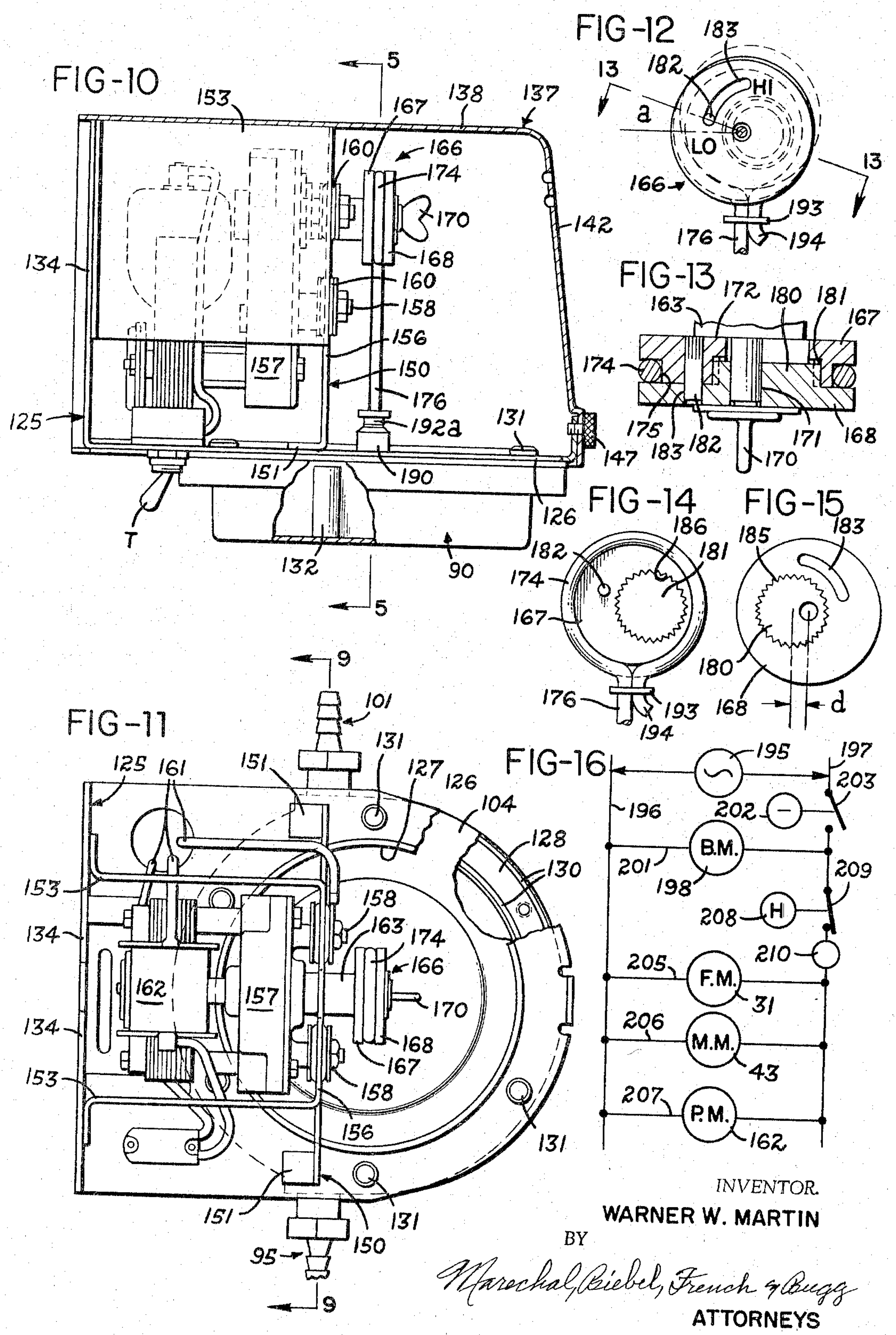
FIG. 10 is a side elevation view of the purge unit with portions thereof broken away to illustrate the structural details.
FIG. 11 is a top plan view of the purge unit also partially broken away to illustrate the construction thereof.
FIG. 12 is a front elevation view of the eccentric cam for driving the purge unit.
FIG. 13 is a sectional view taken along the line 13—13 of FIG. 12.
FIG. 14 is a view of the eccentric cam with the outer disk removed.
FIG. 15 is an elevation view of the rear side of the outer disk of the eccentric cam.
FIG. 16 is a schematic view of the electrical system for the invention.

The base 90 of the purge unit has secured onto the top thereof an L-shaped frame member 125 having a horizontal section 126 with a large opening 127 therein whose peripheral portions are used to clamp the flexible diaphragm 104 to the horizontal surface 128 on the base 90. The surface 128 has a pair of upstanding annular projections 130 (FIG. 9) extending circumferentially around the chamber 90 so that a fluid tight connection is formed when the diaphragm 104 is clamped in place by inserting the screws 131 through suitable openings in the horizontal section 126 of the frame member 125, through the diaphragm 104, and into the internally threaded bosses 132 in the base 90, as shown in FIG. 10.

The vertical section 134 of the frame member 125 forms the rear wall of the unit 12, and screws may be inserted through suitable openings therein to fasten the unit on the furnace wall 11 or the like. A cover 137 fits snugly onto the unit to form the top 138, sides 140 and 141, and front 142 of the unit 12. The slot 144 (FIG. 5) is formed at the lower edge of the side and front walls 140–142 for engaging the edge 145 of the horizontal portion 126 of the frame member 125 so that the cover is easily aligned on the purge unit 12, and the screw 147 (FIG. 10) locks the cover thereto.

A motor bracket 150 is enclosed within the cover 137 and has the spaced feet 151 on the lower end thereof which engage the horizontal section 126, and the vertical brackets 153 on either side thereof extend across the sides thereof and are secured to the frame member 125 by welding. The vertical section 156 of the bracket 150 has a gear reduction unit 157 secured thereto by the bolts 158 which extend through the vibration and noise reducing rubber bushings 160 on the bracket 150. The electrical conductors 161 supply current to and ground the small electric motor 162 which is mounted on the gear reduction unit 157 for driving the same so that a relatively slow rotational speed is obtained at the drive shaft 163 of the unit 157. The toggle switch T (FIG. 10) permits the purge unit 12 to be turned off at any time so that it does not operate with the humidifier 10.

The drive shaft 163 extends through the opening 165 in the vertical section 156 and has a variable stroke eccentric cam 166 on the end thereof disposed substantially directly above the center of the diaphragm 104. The cam 166 includes inner and outer disks 167 and 168 which are clamped to the drive shaft 163 by the screw 170 which extends through the opening 171 formed in the center of the outer disk 168 and into a threaded bore in the end of the shaft 163 to clamp the disks against the radial flange 172 on the shaft 163. In this position, the outer disk 168 is rotating about its axis but the inner disk 167 has its axis offset from that of the outer disk so that the ring 174 which surrounds the axial shoulder 175 on the inner disk 167, and the operating rod 176 connected to this ring, are reciprocated by rotation of the cam 166.

In particular, as seen in FIGS. 12–15, the disks 167 and 168 are secured together in this offset relation by inserting the round projection 180 on the outer disk 168 whose axis is offset a distance *d* and from the axis of rotation into the complementary depression 181 in the inner disk 167. By offsetting the disks angularly about the axis of the projection 180 and depression 181, the inner disk 167 will function as an eccentric as the shaft 163 rotates.

To control the amount of angular offset between the disks 167 and 168, the pin 182 is rigidly secured to the disk 167 for engagement with the arcuate slot 183 in the outer disk 168 so that the angular offset between these disks is limited to the length of the slot 183. FIG. 12 shows the disks 167 and 168 with a minimum offset angle *a* which effects minimum reciprocation of the rod 176, and as this angle increases, the stroke is similarly increased. If the angle *a* were reduced to zero, then there would be no offset and consequently no reciprocation of the rod 172.

The edges of the side surface 185 on the projection 181 and the side wall 186 of the depression 182 are applied so that the disks are held against slippage when they are secured together. To change the relative position of the disks 167 and 168, and thus the stroke of the rod 176, it is merely necessary to loosen the screw 170 to separate the splined surfaces, make the desired angular adjustment, and then retighten the screw.

The diaphragm 140 is rubber or similar flexible material which is formed around the flat annular metal plate 188 having the internally threaded sleeve 190 secured in the center of the upper side thereof so that the ball 191 on the lower end of the rod 176 can be secured to the sleeve 190 on the diaphragm 140 by the threaded retainer 192*a* to effect reciprocation thereof. The rod 176 and the connected ring 174 are preferably formed integrally by deforming a length of wire and using the washer 193 to close the ring 174 and by deforming the end 194 to hold the washer 193 in place, as seen in FIG. 12, or welded together.

As shown in FIG. 16, the source 195 of electrical power supplies current to the conductors 196 and 197 which have the blower motor 198 in the conductor 201 connected thereto so that, when the thermostat 202 closes the switch 203 in response to a rise in temperature within the furnace due to operation of the heat generator, the furnace blower operates to convey air through the furnace. The humidifier motor 31 and 43 and the purge motor 162 in the conductor 205, 206, and 207 are also connected across the conductor 196 and 197 for operation simultaneously with the furnace blower 198 to increase the moisture content of the air being heated by the furnace. If the humidity in the air has reached a desired level, the humidistat 208 will open the switch 209 in conductor 197 to inactivate the humidifier 10 and the purge unit 12 even though the furnace blower is operating. A toggle switch 210 is provided on the upper housing 13 (FIG. 1 in the conductor 197 for manually shutting down operation of the humidifier 10 and purge unit 12.

*Operation*

The process of the invention is best described in connection with the operation of the humidifier 10 and purge unit 12 described above. An initial step in the installation of the system is the calculation of the volume V of water which must be purged from the reservoir 54 to maintain the concentration of dissolved minerals below the level at which precipitation will occur. This is calculated by use of the formula $$V=\frac{E_r K}{24\ (K-K_{in})}$$

where: V is the volume of water to be purged in gallons per hour $E_r$ is the rate of water evaporated by the humidifier or cooler in gallons per day K is the maximum permissible concentration of dissolved minerals in the reservoir in parts per million $K_{in}$ is the concentration of dissolved minerals in inlet water in parts per million.

For example, if the capacity of the humidifier is 10 gallons per day, the value of K is 1000 parts per million, and $K_{in}$ is 500 p.p.m. (equivalent to a hardness of 29.5 grains), the rate of purging V equals to .83 gallon per hour. The purge unit 12 is then set by adjusting the relative positions of the disks 167 and 168 of the cam 166 as described above so that it will pump this amount of water from the reservoir 54 during each hour of operation, as will be further explained.

Assuming that the humidifier 10 and purge unit 12 are properly secured to the furnace wall 11, and that the thermostat, humidistat, and manual switches 203, 209, and 210 are closed, the motor 31 slowly rotates the drum assembly 42 at a predetermined speed to move the lower portion of porous sleeve 50 through the water in the reservoir 54. Thus each of the strands 50*a* becomes wetted to provide a substantial surface area from which this water is evaporated. Rotation of the blower wheel 30 by its motor 31 draws warmed or heated air from the furnace, through the inlet passageway 40 and into the air flow chamber 23.

The increased pressure in the chamber 23 forces air through the highly porous sleeve 50 and drum 47 into the interior of the drum and then through the outlet passage 56 back into the furnace. As the heated air passes through the numerous pores of the sleeve 50 at a relatively high velocity, it evaporates a portion of the moisture on the surfaces of the strands 50*a* with a resulting increase in the moisture content of the air. The rotation of the drum assembly 42 is carefully correlated with the flow and temperature of the air so that each of the strands 51 of the sleeve 50 is constantly wet, and consequently the usual solids or other precipitate which is formed thereon are held to a minimum.

As the heated air passes through the media 50 around each of the individual strands 51, a portion of the water is evaporated therefrom to increase the moisture content of the air. This evaporation causes the concentration of dissolved minerals in the water on the strands to be increased, and heretofore there was no control over the amount of water evaporated from the strands so that at least a portion of the minerals were precipitated on to the strands 50*a* thus leading to clogging of the media. The clogging problem is of course much more critical when a two-dimensional fibrous media is used in the humidifiers and coolers.

In the present invention, the amount of dissolved minerals in solution on each of the strands 50*a* is maintained below the level at which precipitation will occur by carefully correlating the rate of air flow and the speed of the drum 42 so that the concentrated solutions are washed from the strands before precipitation occurs by movement through the reservoir 54 thereby substantially eliminating the deposits of solids on the media and the consequent clogging.

As the sleeve 50 has the relatively highly concentrated solutions washed therefrom, the water within the reservoir 54 naturally has the concentration of dissolved minerals raised accordingly, and if no action were taken, precipitation would eventually occur in the reservoir 54. As some water is evaporated to decrease the level in the reservoir, the float 61 opens the valve 74 to maintain the predetermined level of water in the float chamber 60 and reservoir 54, as described above, but this does not materially dilute the concentration of dissolved minerals in the reservoir since most of the minerals from the evaporated water collect here.

However, the purge unit 12, which has had the necessary capacity adjustment set on the cam 166, operates simultaneously with the blower 30 and drum 42 rotates since the motor 162 is wired to operate at the same time as the motors 31 and 43. As the motor 162 rotates, it effects rotation of the drive shaft 163 of the speed reduction unit 157 at a relatively slow speed to cause the eccentric cam 166 to be rotated to reciprocate the rod 176 and the diaphragm 104 through a predetermined stroke.

When operation of the unit initially starts, the chamber 91 will be filled with air, and this air must be removed before the pumping of water will commence. Thus downward movement of the diaphragm 104 compresses the air within the chamber 91 causing a portion thereof to flow through the outlet passage 97 and the valve 111 whose valve element 120 opens by reason of the increased pressure within the tubular portion 114. As the diaphragm 104 starts upwardly, the chamber 91 is expanded thus closing the valve member 120 and opening the corresponding member 120 in the inlet valve 110 to draw water from the reservoir 54 through the inlet 92 and into the chamber 91.

The next downward stroke of the diaprhagm 104 will cause an additional portion of the air in the chamber 91 to be exhausted through the outlet 97 in the manner described above, and the next upward stroke draws additional water to be drawn from the reservoir 54 in the chamber 91. The raised inlet 102 allows substantially all of the air to be ejected from the chamber 91 before any of the water is eliminated therefrom, thus eliminating the possibility of a large air pocket forming below the diaphragm 104 as would otherwise occur if the outlet 97 were adjacent the bottom of the unit 90. Such an air pocket might result in a compressing of the air in the chamber rather than a pumping of the substantially incompressible water.

Once the air is completely eliminated from the purge unit 12, each upward stroke of the diaphragm draws additional water into the chamber 91 through the valve 110 and each downward stroke pumps a corresponding volume of fluid through the outlet 97, the valve 111 and the drain. As discussed above, the amount of water that is removed from the reservoir 54 is carefully correlated with the concentration of salts therein so that the concentration of dissolved minerals never reaches the point at which precipitation will occur and so that a very minimum amount of water is removed. As a result, there are substantially no mineral deposits on the media and in the reservoir, and the only deposits which do form result from the water being evaporated from a strand to the point that a solid crystal is formed between the time this particular strand is passed through the reservoir. It has been found that more than 90 percent of the deposits are eliminated by the process described herein.

As indicated above, the volume V of water which must be removed from the reservoir has been carefully determined in accordance with the above formula so that the concentration of the mineral salts within the reservoir never reaches a point where precipitation will occur. The formula is based on the design capacity of evaporation rate $E_r$ of the humidifier. When the humidifier cycles infrequently, for example during warm or humid weather, the purge unit 12 operates at a proportionally reduced amount, and the same is true if the humidifier operates very frequently. The purge unit removes a proportionally increased volume of water, so that no minerals are precipitated and at no time is there pumped from the reservoir 54 any unnecessary water. The purge unit 12 has its capacity easily varied to facilitate its use with humidifiers and coolers of different capacities. The unit 12 is self-contained and can be mounted on, above, or below the humidifier since the flow of water therethrough is positive and not dependent on gravity. The unit is made simple by the process of the invention since there are substantially no solids in the water being handled thereby.

*Another embodiment*

Figure 17:
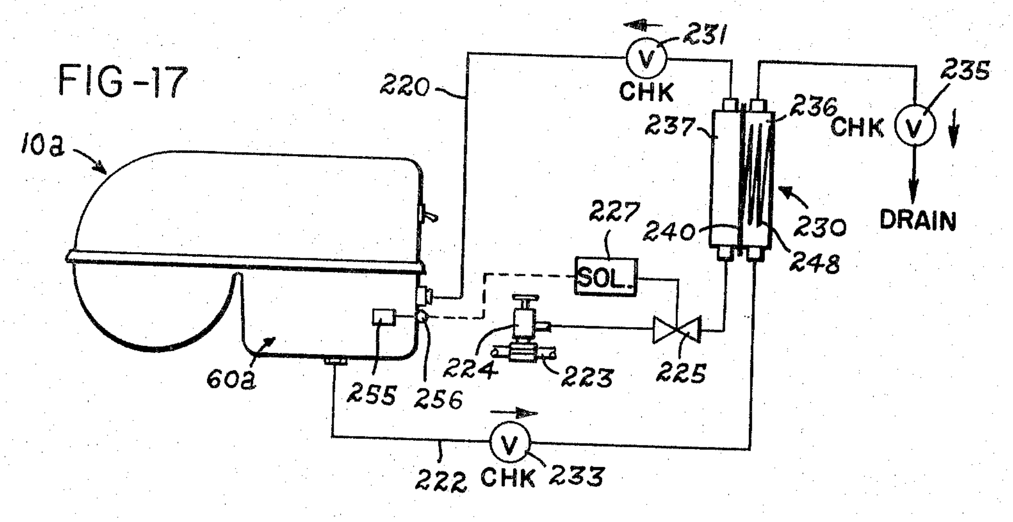
FIG. 17 is a diagrammatic illustration of another embodiment of the invention.
Figure 18:
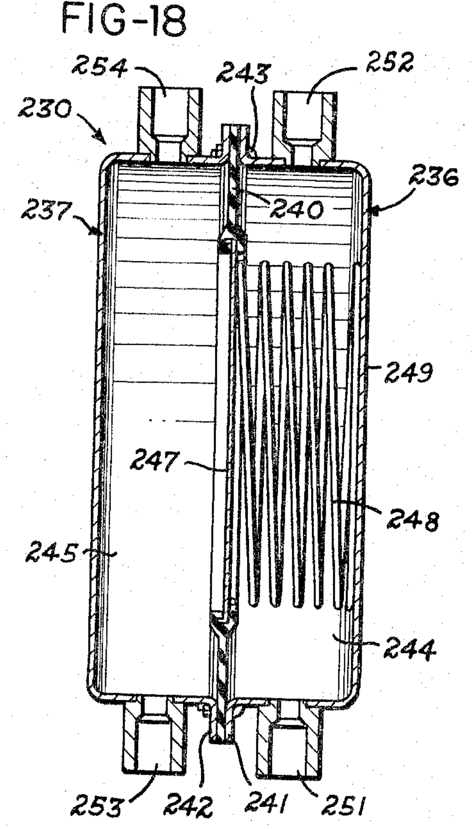
FIG. 18 is a sectional view through the interior of the pump unit used in the system shown in FIG. 17.
Figure 19:
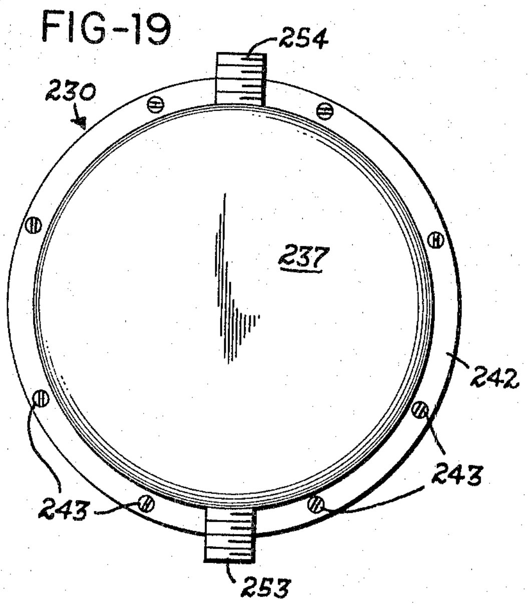
FIG. 19 is a side view of the pump shown in FIG. 18.

Another embodiment of the invention is shown in FIGS. 17–19, including a humidifier 10*a* which is substantially identical to the humidifier 10 described above. This humidifier has a water inlet line 220 which is connected to the float chamber 60*a*, and a drain line 222 is connected to the reservoir of the humidifier 10*a* in much the same manner as the drain line 93.

The inlet line 220 is connected to the household water supply line 223 through the manual valve 224, and the shut-off valve 225 operated by the solenoid 227, the purge unit 230, and the one-way valve 231 are placed in the line 220. The drain line 222 is connected to the drain through the one-way valve 233, the purge unit 230, and another one-way valve 235 downstream of the purge unit.

The purge unit 230 is shown in FIGS. 18 and 19, and includes a pair of cup-shaped housing members 236 and 237 which are secured together with the flexible diaphragm 240 clamped between the annular radially outwardly extending flanges 241 and 242 by the screws 243 (see FIG. 19). The diaphragm 240 divides the assembled purge unit 230 into a pair of fluid tight chambers 244 and 245 whose size depends upon the capacity required, as will be further described. The diaphragm 240 has a metal plate 247 secured in the center portion thereof to form a seat for one end of the coil spring 248 which is located in the chamber 244 and also bears against the wall 249 of the housing member 236. The housing member 236 is provided with the inlet and outlet ports 251 and 252 which connect the chamber 244 to the drain line 222, whereas the member 237 is provided with the inlet and outlet ports 253 and 254 for connecting the chamber 245 to the supply line 220. A float 255 in the float chamber 60*a* closes the electrical switch 256 when the level of water drops between the predetermined level, and these switches complete an electrical circuit to the solenoid 227.

In operation, each time the water level drops, e.g., due to evaporation of water from the media, the solenoid 227 is energized, and water flows through the line 220 to the float chamber 60*a*. At the same time, the water pressure within the line 220 expands the chamber 245 of the purge unit 230 against the bias of the spring 248. When the water level in the chamber 60*a* is restored, the valve 226 closes and the pressure in the chamber 245 is relieved so that the spring returns the diaphragm 240 to its original position with a consequent increase in the volume of the chamber 245.

The check valves 233 and 235 on either side of the chamber 244 permit water to flow from the reservoir into the chamber 244 and then from this chamber to the drain. Accordingly, when the chamber 244 expands, a preset volume of water is drawn from the reservoir into the chamber 244. The next time that the valve 226 opens and pressurizes the chamber 245, the water in the chamber 244 is pumped through the check valve 235 to the drain. This operation is repeated each time the valve 226 is open and closed to maintain the predetermined level of water in the reservoir.

In order to insure that the desired volume V of water is removed, it is necessary to carefully correlate the volume of the chamber 244 with the usual cycling of the solenoid 227. Normally, during operation of the humidifier, the solenoid will be energized and deenergized several times so that the desired amount of concentrated water is purged from the reservoir. This selection of the float operated switch 256 is also important since its sensitivity will dictate the frequency at which the water supply valve 226 is opened, and thus the rate at which the concentrated water is removed from the reservoir. It should be noted that the purging of the unit 230 will be dependent on the operation of the humidifier since the water level will not drop appreciably when the unit 10*a* is inactive. Of course, the solenoid 227 could be placed in the circuit with the humidifier motors so that it remains deenergized during the period that these motors are inactive.

The important advantage in the unit 230 is that it does not require a motor to operate it since it uses the water line pressure. This results in a cheaper device requiring less maintenance. Moreover, it is within the scope of the invention to construct the purge unit 230 with the check valves 231, 233, and 235 within the ports 254, 251, and 252, respectively, of the unit 230, and to mount the valve 226 on the unit for cooperation with the port 253. The entire unit could also be constructed in the humidifier housing without departing from the scope of the invention.

*Summary*

The invention has thus provided a process and apparatus for maintaining the level of concentration of dissolved salts in solution just below the concentration at which precipitation will begin to occur in the reservoir or on the media. This is accomplished without wasting any more water than absolutely necessary because the capacity of the purge is carefully correlated with the capacity of the humidifier or evaporative cooler. Moreover, the purge unit operates only when the humidifier or evaporative cooler operates, and therefore the purge unit does not operate in periods when operation is not necessary.

The type of purge units used in combination with the humidifier or evaporative cooler to practice the novel process can be varied without departing from the scope of the invention so long as functional requirements described above are substantially maintained. Moreover, both the purge units shown can be used with substantially any humidifier or evaporative cooler to practice this invention. The humidifier also could be mounted in other places than the furnace wall as described.

While the method herein described, and the forms of apparatus for carrying this method into effect, constitute preferred embodiments of the invention, it is to be understood that the invention is not limited to the precise method and forms of apparatus, and that changes may be made in either without departing from the scope of the invention which is defined in the appended claims.

What is claimed is:

1. Apparatus for adding moisture to the air comprising, a humidifier having a reservoir therein, flow control means for maintaining a preset level of tap water in said reservoir, a highly porous non-absorbent evaporation media, frame means for guiding movement of said media along a predetermined path so that a portion of said media is always submerged in said reservoir, means for moving said media along said path, fan means for forcing air over and through said media to evaporate water from the surfaces thereof, means correlating the speed of movement of said media and the flow of air so that said surfaces of said media remain wet at all times, and a purge unit for removing a preset minimum amount of said highly concentrated water from said reservoir so that said water level control means supplies additional tap water thereby diluting the concentration of minerals in solution in said reservoir to reduce substantially the deposition of said minerals on said media or in said reservoir, and means to cause operation of said purge unit in response to operation of said flow control means to maintain said preset level so that the operation of said purge unit is correlated to the amount of water being evaporated from said media.

2. Apparatus as defined in claim 1 wherein the water is purged from said reservoir by said purge unit at a rate equal to $$\frac{E_r K}{K-K_{in}}$$

where $E_r$ is the evaporation of said humidifier, K is the maximum permissible concentration of dissolved minerals in said reservoir which will not cause precipitation, and $K_{in}$ is the concentration of dissolved minerals in the water supplied to said reservoir by said flow control means, to thus maintain the level of dissolved minerals in the water in said reservoir below the point at which precipitation will occur to eliminate substantially the deposition of the minerals on said surface of said media or in said reservoir.

3. Apparatus as defined in claim 1 wherein said purge unit is operated by the flow of water in said flow control means.

4. Apparatus as defined in claim 1 wherein said purge unit includes a housing having a flexible diaphragm member therein to divide said housing into first and second chambers, each of said chambers having an inlet and an outlet, said inlet to said first chamber adapted to be connected to a water supply to supply water under pressure to said first chamber when said flow control means supplies water to said reservoir thereby expanding said first chamber and decreasing the size of said second chamber, said outlet of said second chamber being connected to said reservoir, check valve means permitting flow only from said outlet of said first chamber, check valve means permitting flow only into said second chamber through said inlet, and said outlet of said second chamber being connected to a drain so that said housing operates as a pump to remove a predetermined amount of water from said reservoir each time said flow control means is actuated to supply water to said reservoir.

5. Apparatus as defined in claim 4 wherein spring biasing means are provided to return said diaphragm when said pressure is relieved in said first chamber.

6. A purge unit adapted for connection to the reservoir of a device for evaporating water having dissolved minerals therein, comprising a housing partially defining an expandable chamber having an inlet and an outlet thereto, a flexible diaphragm secured to said housing to define one side wall of said expandable chamber within said housing, conduit means for connecting said inlet to the reservoir, means for connecting said inlet to the reservoir, means for connecting said outlet to the drain, one-way valve means associated with each of said inlet and outlet for permitting flow only into said chamber from said inlet and flow only from said chamber through said outlet, motor means mounted on said housing and having a drive shaft, an eccentric cam on said drive shaft disposed in alignment with said diaphragm, means interconnecting said diaphragm and said eccentric cam for reciprocating said diaphragm when said motor rotates, and electrical means for supplying electrical current to said motor means only during the period of operation of the air moving means of the humidifier to remove a portion of the water in the reservoir and thereby to maintain the concentration of dissolved minerals in solution in the reservoir below the level at which precipitation of the minerals will occur.

7. A purge unit adapted for connection to the reservoir of a device for evaporating water having dissolved minerals therein, comprising a housing partially defining an expandable chamber having an inlet and an outlet thereto, a flexible diaphragm secured to said housing to define one side wall of said expandable chamber within said housing, conduit means for connecting said inlet to the reservoir, means for connecting said outlet to the drain, one-way valve means associated with said inlet and outlet for permitting flow from said chamber through said outlet, motor means mounted on said housing and having a drive shaft, an eccentric cam on said drive shaft disposed in alignment with said diaphragm, means interconnecting said diaphragm and said eccentric cam for reciprocation of said diaphragm when said motor rotates, said eccentric cam on said drive shaft including means thereon for varying the eccentricity thereof to vary proportionally the stroke of said diaphragm, and electrical control means for energizing said motor means only during the period of operation of the air moving means of the humidifier to effect removal of a portion of the water in the reservoir and thereby to maintain the concentration of dissolved minerals in solution in the reservoir below the level at which precipitation of the minerals will occur.

8. A purge unit adapted for connection to the reservoir of a device for evaporating water having dissolved minerals therein, comprising a housing partially defining an expandable chamber having an inlet and an outlet thereto, a flexible diaphragm secured to said housing to define one side wall of said expandable chamber within said housing, conduit means for connecting said inlet to the reservoir, means for connecting said outlet to the drain, one-way valve means associated with said inlet and outlet for permitting flow only into said chamber through said inlet and flow only from said chamber through said outlet, motor means mounted on said housing and having a drive shaft, eccentric cam means on said drive shaft including first and second disk members, means securing said first disk to said drive shaft for rotation about the center of said first disk, a projection on said first disk having its center offset a preset distance from said center of said first disk, said second disk having a depression therein complementary to said projection and having the center of said depression spaced from the center of said second disk said preset distance, a circumferential shoulder formed concentrically on said second disk, means for securing said disks together so that said projection is held tightly in said depression, means for limiting the minimum amount of angular offset between said disks so that said second disk acts as an eccentric as said cam means rotates, actuator means surrounding said shoulder and having an actuator rod thereon which is connected to said diaphragm and reciprocates in response to rotation of said cam means, and electrical control means for energizing said motor means only during the period of operation of the air moving means of the humdifier to continuously remove a portion of the water in the reservoir and thereby to maintain the concentration of dissolved minerals in solution in the reservoir below the level at which precipitation of the minerals will occur.

9. A purge unit adapted for connection to the reservoir of a device for evaporating water having dissolved minerals therein, comprising a housing partially defining an expandable chamber having an inlet and an outlet thereto, a flexible diaphragm secured to said housing to define one side wall of said expandable chamber within said housing, conduit means for connecting said inlet to the reservoir, means for connecting said outlet to the drain, one-way valve means associated with said inlet and outlet for permitting flow only into said chamber through said inlet and flow only from said chamber through said outlet, motor means mounted on said housing and having a drive shaft, eccentric cam means on said drive shaft including first and second disk members, means securing said first disk to said drive shaft for rotation about the center of said first disk, mating means on said first and second disks offset a preset distance from the centers thereof for securing said disks together so that said second disk acts as an eccentric as said cam means rotates, actuator means interconnecting said second disk and said diaphragm for reciprocation of said diaphragm in response to rotation of said cam means, and electrical control means for energizing said motor means only during the period of operation of the air moving means of the humidifier to remove a portion of the water in the reservoir and thereby to maintain the concentration of dissolved minerals in solution in the reservoir below the level at which precipitation of the minerals will occur.

References Cited by the Examiner

UNITED STATES PATENTS

| | | | |
|---|---|---|---|
| 3,126,427 | 3/1964 | Broughton | 261—2 |
| 3,149,626 | 9/1964 | Wentling et al. | |
| 3,151,188 | 9/1964 | Weatherston et al. | 261—91 X |
| 3,171,401 | 3/1965 | McDuffee. | |
| 3,228,665 | 1/1966 | Dolon | 261—97 X |

HARRY B. THORNTON, *Primary Examiner.*

T. R. MILES, *Assistant Examiner.*